Dec. 6, 1932.  N. J. THELEN ET AL  1,890,136
CORN PLANTER
Filed Oct. 14, 1930  3 Sheets-Sheet 1
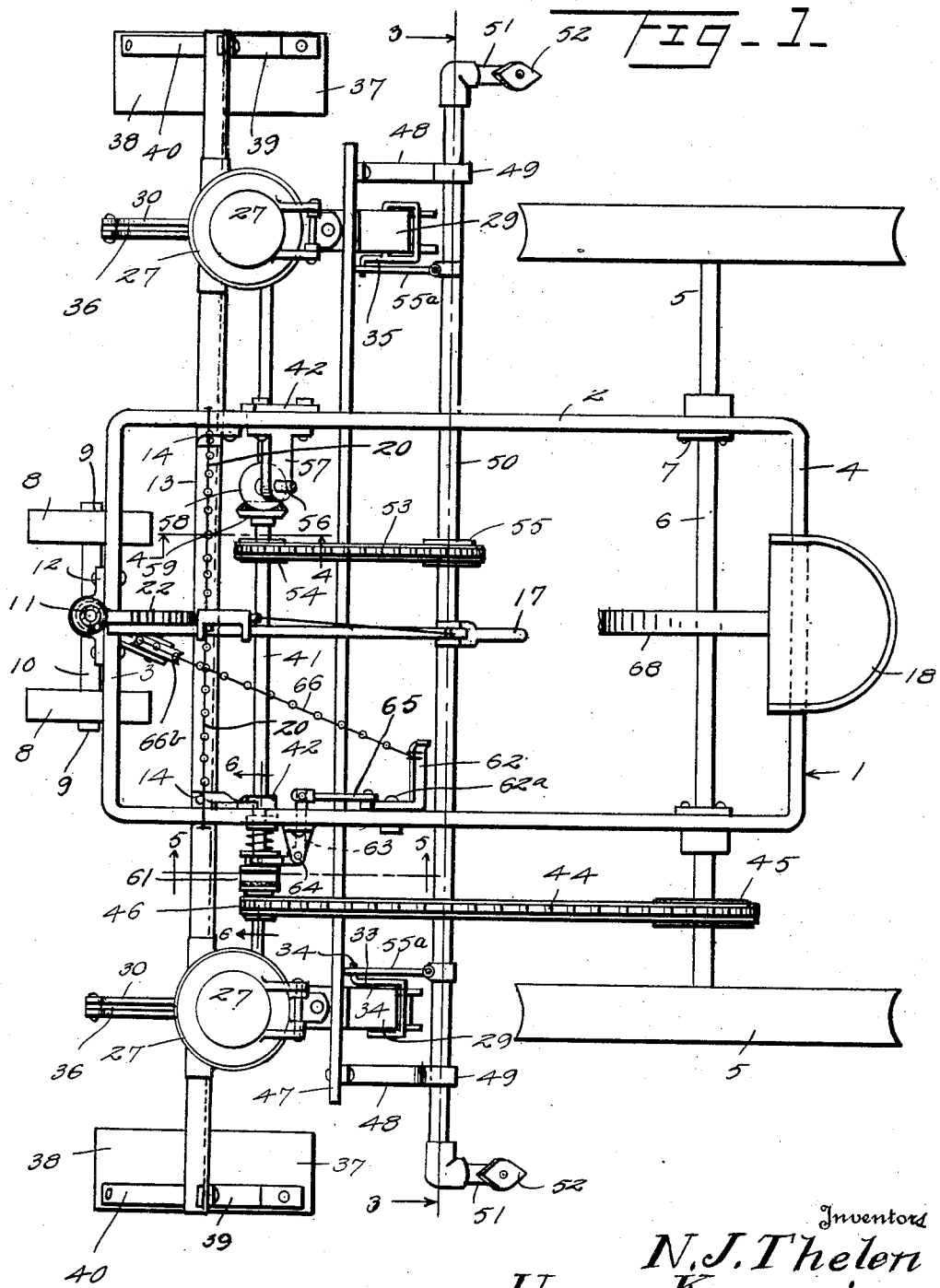
Inventors
N. J. Thelen
Henry Koopmeiners
Alois Koopmeiners
By Watson E. Coleman

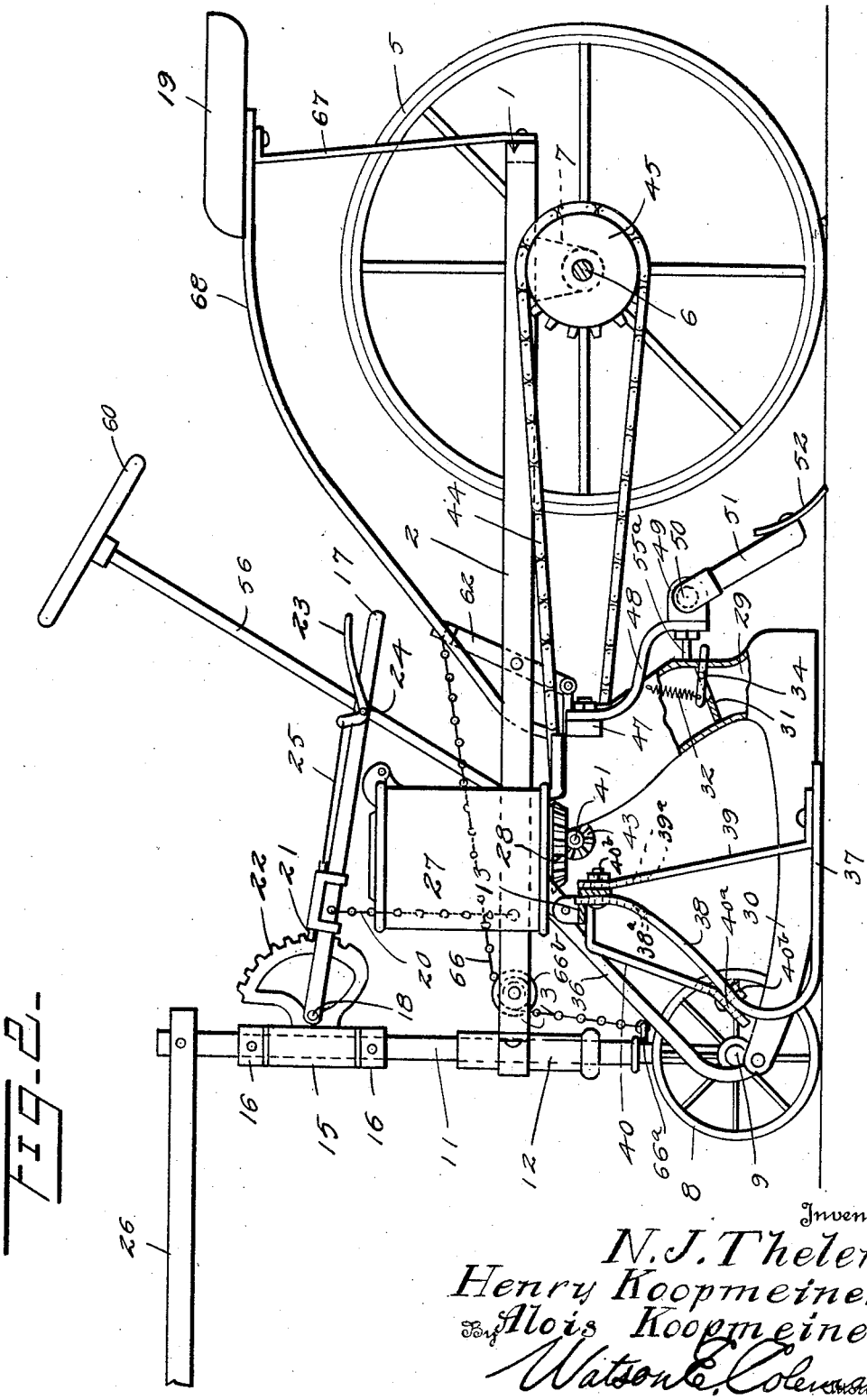

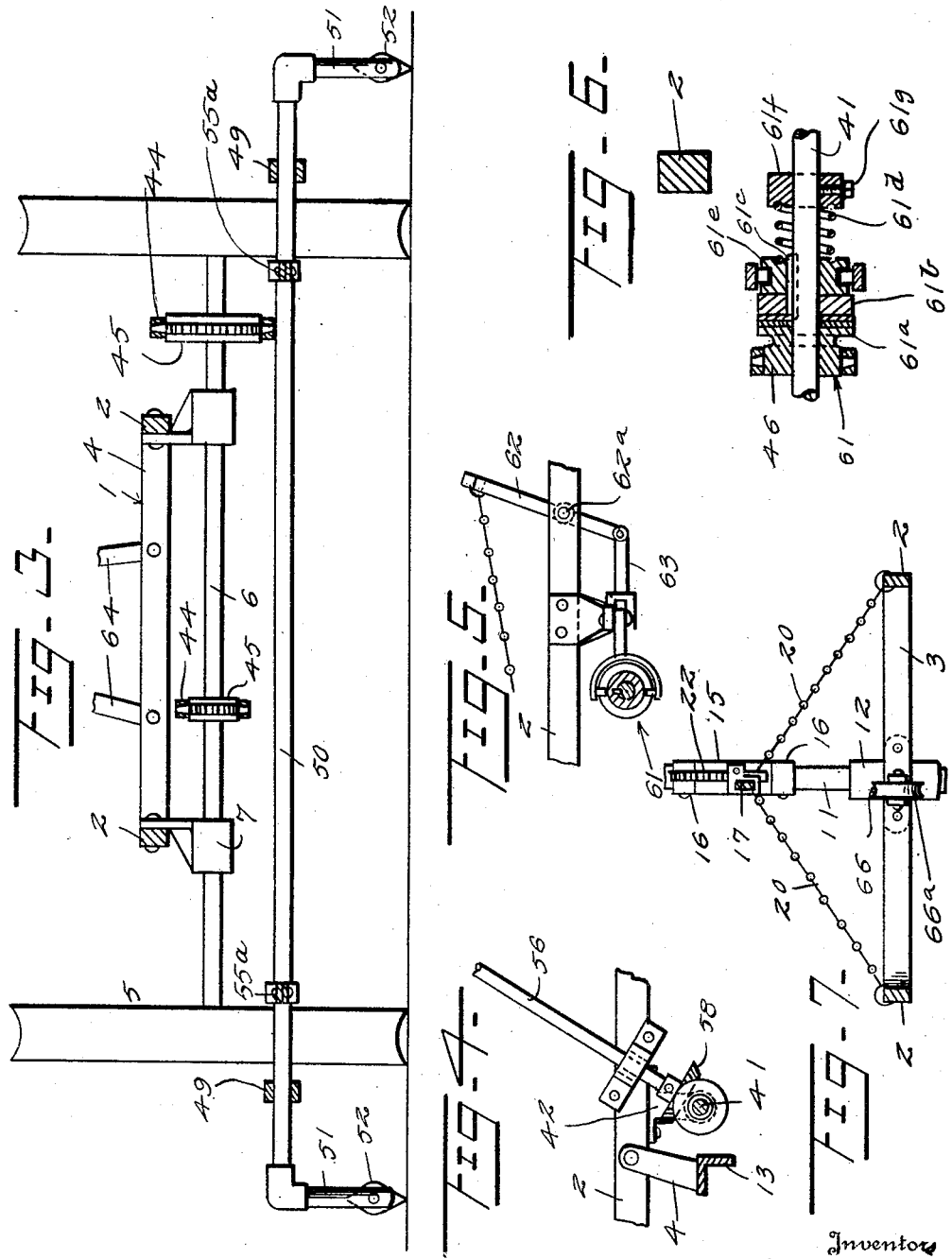

Patented Dec. 6, 1932

1,890,136

UNITED STATES PATENT OFFICE

NICHOLAS J. THELEN, OF ST. CLOUD, AND HENRY KOOPMEINERS AND ALOIS KOOPMEINERS, OF FREEPORT, MINNESOTA

CORN PLANTER

Application filed October 14, 1930. Serial No. 488,656.

This invention relates to check row corn planters of that type wherein the seed dropping means are operated without the aid of a check-line and has for one of its objects to improve and simplify the general construction of machines of this character and to provide one which shall be simple, durable, efficient and capable of being manufactured and sold at a comparatively low cost.

The invention has for a further object to provide a corn planter of the character stated wherein the seed dropping means shall be adapted to be operated from the axle of the carrying wheels, and wherein the seed dropping means shall be adapted to be manually operated to advance or retard the dropping of the seed so as to effect the proper alining of the hills.

The invention has for a further object to provide a corn planter of the character stated wherein the marker shaft shall be driven from the check or seed dropping means operating shaft and at the same rate of motion of such shaft so as to effect the accurate marking of the hills.

The invention has for a further object to provide a corn planter of the character stated which shall embody shoes adapted to form broad smooth tracks laterally beyond the hills, and wherein the marker shaft shall be provided with shovels adapted to form the hill locating marks in such paths, to the end that such marks will be plainly visible and thus enable the hills of the respective rows to be alined.

The invention has for a still further object to provide a corn planter of the character stated wherein the shoes shall also be adapted to evenly support the furrow openers and shall be adjustable to regulate the depth of penetration of the furrow openers.

With the foregoing and other objects in view, the nature of which will appear as the description proceeds, the invention consists in the construction, combination and arrangement of parts hereinafter fully described and claimed, and illustrated in the accompanying drawings, wherein :—

Figure 1 is a top plan view of a corn planter constructed in accordance with our invention;

Figure 2 is a view in side elevation of the corn planter;

Figure 3 is a sectional view taken on the vertical plane indicated by the line 3—3 of Figure 1;

Figure 4 is a detail sectional view taken on the vertical plane indicated by the line 4—4 of Figure 1;

Figure 5 is a detail sectional view taken on the vertical plane indicated by the line 5—5 of Figure 1;

Figure 6 is a sectional view taken on the vertical plane indicated by the line 6—6 of Figure 1; and Figure 7 is a transverse sectional view illustrating the manner in which the frame raising lever is connected to the frame.

The corn planter comprises a frame 1 which consists of side or longitudinal bars 2 and front and rear cross or transverse bars 3 and 4, respectively. The frame 1 is supported at its rear end by covering wheels 5 which are fixedly secured to an axle 6 journaled in bearings 7 carried by the frame bars 2. The frame 1 is supported at its front end by wheels 8 which are mounted upon an axle 9 journaled in a bearing sleeve 10 fixedly secured at its lower end to a vertical shaft 11. A bearing sleeve 12 fixed to the front frame bar 3 at the longitudinal center of the planter, has the shaft 11 rotatably journaled therein and is slidable upwardly and downwardly on the shaft, to the end that the shaft and wheels 8 may be turned during the steering of the planter, and to the end that the front end of the frame 1 may be raised or lowered for a purpose to be presently set forth. A bar 13 extending transversely of the frame 1 near the front end of the latter, is located below the frame, and extends laterally beyond both sides of the frame.

A sleeve 15 is rotatably mounted upon the upper portion of the shaft 11 between collars 16 riveted to the shaft. A lever 17 is pivoted at one end, as at 18, to and extends rearwardly from the sleeve 15 with its rear end arranged conveniently to the driver's seat 19 of the machine. Flexible elements 20, which may consist of chains as shown, are connected to the lever near the front end of the latter and are connected to frame side bars 2 near the front ends of the latter. The lever 17 provides means through the medium of which the front end of the frame 1 may be raised or lowered. The frame 1 is secured in its adjustable position by a dog 21 carried by the lever 17 and engaging a notched sector 22 fixed to and extending rearwardly from the sleeve 15.

The dog 21 is of the usual spring pressed type, and is adapted to be withdrawn from engagement with the sector 22 by a finger lever 23 pivoted, as at 24, to the lever 17 and connected by a link 25 to the dog. A draft tongue or pole 26 is secured to the upper end of the shaft 11.

Seed hoppers 27 are secured to the cross bar 13 laterally beyond the frame 1, and are equipped with seed dropping means, not shown. These means, which may be of any well known or appropriate type, include bevel operating gears 28. Boots 29, which are secured at their upper ends of the hoppers 27 and at their lower ends to the rear ends of furrow openers 30, receive the seeds from the dropping means and convey them to the furrows. The boots 29 are provided intermediate their ends with valves 31 which are normally supported by springs 32 in a position to arrest the passage of the seeds through the boots and which are adapted to be tripped or moved downwardly to permit the passage of the seeds from the boots to the furrow. Levers 33 extending upwardly and forwardly from the pivots 34 of the valves 31 and provided at their upper ends with arms 35, provide means through the medium of which the valves may be tripped. The furrow openers 30 are secured at their front ends to the lower ends of arms 36 which extend downwardly and forwardly from the cross bar 13.

Broad flat shoes 37 extend rearwardly from the lower ends of arms 38 which are secured at their upper ends to the cross bar 13 laterally beyond the hoppers 27. The shoes 37 and their attaching arms 38 are formed integrally, and these parts are reinforced by rear braces 39 which are secured to the shoes and cross bar 13 and by front braces 40 which are secured to the cross bar and the lower ends of the attaching arms. The shoes 37 evenly support the furrow openers 33 and regulate their depth of penetration, and they are adjustable vertically with respect to the cross bar 13 in order to permit the depth of penetration of the furrow openers to be varied. The upper end portions of the arms 38 and braces 39, and the lower end portions of the braces 40, are provided with longitudinal rows of openings 38ª, 39ª and 40ª, respectively. The attaching bolts 40ᵇ pass through certain of these openings, and the arrangement of these opening longitudinally of the parts 38, 39 and 40 permits the adjustment of the shoes 37. The shoes 37 further provide laterally beyond the furrows smooth tracks in which are formed marks opposite each hill of seed, to the end that the seeds may be planted in hills that may be cultivated in the direction of the length and transversely of the rows.

The dropping means of the hoppers 27 are operated by a shaft 41 which is journaled in bearings 42 extending downwardly from the frame bars 2 and which is provided at its ends with bevel gears 43 meshing with the gears 28 of the dropping means. The check shaft 41 is rotated from the axle 6 by a sprocket chain 44 passing about a sprocket wheel 45 fixed to the axle and a sprocket wheel 46 clutched to the shaft 41.

A bar 47, extending transversely of and located below the frame 1, is fixed to the rear sides of the upper ends of the boots 29, and extending downwardly therefrom are bracket arms 48 which are provided at their lower ends with bearings 49. A marker shaft 50 is journaled in the bearings 49 and is provided at its ends with arms 51 to which marker shovels 52 are fixed. The marker shaft 50 is operated from the check shaft 41 by a sprocket chain 53 which passes about a sprocket wheel 54 fixed to the check shaft and a sprocket wheel 55 fixed to the marker shaft.

The sprocket wheels 54 and 55 are similar as to size so that the check shaft 41 and marker shaft 50 will rotate at the same rate of speed. The marker shovels 52 are located directly in rear of the shoes 37, and once during each rotation of the marker shaft 50, the marker shovels engage the smooth tracks formed by the shoes. Immediately before the marker shovels 52 engage such smooth tracks, trips 55ª carried by the marker shaft 50 contact with the arms 35 to effect the tripping of the valve plates 31, to the end that the marks made by the marker shoes will be located directly opposite the hill in which the seeds are planted as the result of the tripping of the valve plate.

After the first rows of hills have been planted, the machine is turned around and brought to a stop with one of the boots 29 arranged directly opposite one of the last holes or marks made by the marking shovels 52. The dropping means are then manually operated to effect the planting of hills of seed, and this is done through the medium of means which comprises a shaft 56 journaled in a bearing 57 carried by the frame 1, meshing gears 58 and 59 fixed respectively to this shaft and the check shaft 41, and a hand wheel 60 fixed to the shaft 56 and located conveniently to the driver's seat 19.

After the depositing mechanisms have been thus manually adjusted or timed, the machine is set in motion, and if the marks now being made by the marking shovels 52 are not in exact line with those previously made, the dropping means are advanced or retarded through the medium of the hand wheel 60. The gear 58 is larger than the gear 59, and these gears are constantly in engagement, with the result that the hand wheel 60 is, while the machine is in use, constantly turning at a low rate of speed. The motion of the hand wheel 60 is retarded to effect the retarding of the operation of the seed dropping means, and the motion of the hand wheel is accelerated to effect the advancing of the operation of the seed dropping means. The sprocket wheel 46 is releasably connected to the check shaft 41 by a friction clutch 61 which, during the retarding or advancing of the operation of the seed dropping means, slips to disconnect the check shaft from the axle 6.

The clutch 61 comprises a member 61ª loose in the check shaft 41 and carrying the sprocket wheel 46, a member 61ᵇ splined, as at 61ᶜ, to the check shaft, and a spiral spring 61ᵈ mounted in the check shaft between collars 61ᵉ and 61ᶠ. The collar 61ᵉ is engaged with the key 61ᶜ and bears against the clutch member 61ᵇ, and the collar 61ᶠ is fixed to the check shaft 41 by a set screw 61ᵍ. The clutch members 61ª and 61ᵇ have their opposed faces provided with friction discs 61ʰ preferably of leather.

A foot lever 62 is pivoted intermediate its ends, as at 62ª, to one of the frame bars 2, and has its angular upper end arranged conveniently to the driver's seat 18. An elbow lever 63 is pivoted at the juncture of its arms, as at 64, to the frame bar to which the lever 62 is pivoted. One arm of the lever 63 is engaged with the collar 61ᵉ, and the other arm of the lever is connected to the lever 62 by a link 65, these parts constituting means through the medium of which the clutch 61 may be thrown when the machine is to be turned. When the clutch 61 is thrown, the check shaft 41 is free of driving connection with the axle 6, and in view thereof, the machine may be turned at the end of a row without operating the seed dropping means. A flexible member 66, which may be in the form of a chain as shown, is connected at one end, as at 66ª, to the lower end of the shaft 11, passes upwardly and rearwardly about a direction pulley 66ᵇ fixed to the front frame bar 3, and is connected to the upper end of the clutch throwing lever 62. When the lever 17 is operated to raise the front end of the frame 1 and thus carry the furrow openers 30, shoes 37 and marker shovels 52 above the ground, the flexible element 66 rocks the lever 62 in a direction to throw out the clutch 61, with the result that the machine may be moved with these parts elevated without operating the seed dropping means. Rear supports 67 and front supports 68 are provided for the seat 19, and are fixed to the rear frame bar 4 and to the cross bar 47, respectively.

From the foregoing description, taken in connection with the accompanying drawings, it should be understood that the machine provides smooth tracks in which the hill indicating marks are made by the shovels 52, and that in view thereof, the marks are so clearly visible to the driver as to enable him to plant the seed in properly alined hills.

It should also be understood that the means for advancing or retarding the operation of the seed dropping means may be easily and conveniently operated to effect the planting of the seed in properly alined hills.

It will further be apparent that the four-wheel gear of the machine enables very short turns to be made and enables the machine to be easily handled while driving it back and forth across the field. As the front end of the frame 1 may be raised through the medium of the lever 17, the machine may be driven from field to field with the furrow openers 30, shoes 37 and marker shovels 52 supported out of contact with the ground and with the connection between the axle 6 and seed dropping means interrupted.

It will still further be apparent that, as the lever 17 is connected to the frame 1 by flexible elements, designated 20, the movement of the front wheels 8 into a depression in the field or their passage over an elevation therein will take place independently of the shoes 37, and in view thereof such movement of the wheels 8 will not impart a corresponding movement to the shoes and the seed will not be planted deeper or shallower as the result of such movement of the wheels. In this connection attention is called to the fact that the front end of the frame 1 is supported from the shaft 11 solely by the lever 17 and flexible elements 20.

While we have described the principle of the invention, together with the structure which we now consider the preferred embodiment thereof, it is to be understood that the structure shown is merely illustrative and that such changes may be made, when desired, as fall within the scope of the invention as claimed.

We claim:—

A corn planter including an axle, covering wheels fixed to the axle, furrow openers, hoppers having seed dropping means, boots extending from the hoppers to the furrow openers, a check shaft geared to the seed dropping means, a shaft constantly driven by the check shaft for manual acceleration to advance the operation of the seed dropping means and for manual retardation to retard the operation of said means, and means establishing a driving connection between the axle and check shaft and embodying a clutch adapted to slip during the advancing or retarding of the seed dropping means.

In testimony whereof we hereunto affix our signatures.

NICHOLAS J. THELEN.
HENRY KOOPMEINERS.
ALOIS KOOPMEINERS.